2,997,387
PHOTOGRAPHIC REPRODUCTION
Arnold Tanenbaum, London, England, assignor to Ozalid Company Limited, London, England, a British company
No Drawing. Filed Dec. 15, 1958, Ser. No. 780,226
Claims priority, application Great Britain Dec. 17, 1957
9 Claims. (Cl. 96—1)

This invention relates to the preparation of photographic and like reproduction materials and is concerned with materials for use in electro-photographic and like methods and with materials prepared by such methods.

Materials hitherto used in electrophotographic reproduction methods include one type comprising a metal plate coated with a photoconductive insulating substance in the form of a layer thereon, the said coating comprising amorphous or alpha monoclinic selenium uniformly dispersed in a thermoplastic synthetic resinous binder such as, for instance, polystyrene, chlorinated rubber, silicone resin, acrylic resin or vinyl-chloride-acetate resin. Another type which has been proposed comprises a paper base material coated with zinc oxide particles uniformly suspended in an insulating resin binder, such as polyvinyl acetate resin, to provide a photoconductive insulating layer thereon.

In the preparation of such materials it has been necessary, for the proper working of the electrophotographic method, so to select the binder for the photoconductive substance, i.e. the selenium or zinc oxide particles, that the electrical resistivity of the binder material lies above $10^{10}$ and preferably above $10^{13}$ ohms per centimeter cube. Further, in the production of such coatings, inflammable organic solvents have been required, rendering the coating operation both expensive and somewhat hazardous.

It is one of the objects of the present invention to provide an improved and simplified method for the preparation of electrophotographic materials in which the use of organic solvent or other more difficult and expensive types of coatings are avoided.

The present invention provides a process for the preparation of electrophotographic or like material, which process comprises forming an aqueous coating composition comprising a photoconductive substance and resin-forming water-soluble substance or mixture of such substances in aqueous solution in the composition, applying said composition to a support to form a coating layer thereon, and removing water from said layer and reacting the resin-forming substance or mixture to convert the same to an irreversibly water-insoluble resin.

In a preferred embodiment, the invention comprises a process for the preparation of electrophotographic or like material, which process comprises the steps of forming an aqueous coating composition comprising a photoconductive substance and at least one resin-forming substance which is water-soluble, present in the composition in aqueous solution, applying said composition to a support to form a coating layer thereon, removing water from said layer in a drying step, and thereafter irreversibly converting said at least one resin-forming substance in the presence of a resinification catalyst into a water-insoluble resin.

The conversion of the resin-forming substance to the irreversible water-insoluble state may be effected at elevated temperature, as a heat-curing operation. Such heating is preferably at a temperature of 100° C. or more in order to remove water released in the chemical reaction involved in the conversion of the resin-formers to the insoluble resin.

The catalyst (also referred to as the accelerator), may be included in the coating composition, being added to an aqueous solution of the resin forming substance or substances, before, simultaneously with, or after, addition of the photoconductive substance. When added before the photoconductor, preliminary stages of condensation may be enabled to take place at room temperature.

Instead of the catalyst being contained in the coating composition, it is also possible to use a vapour catalyst in the presence of which the coated support is heated to effect the conversion of the water-insoluble resin.

Instead of heat-curing the support coated with the coating composition containing a catalyst may be merely dried, conversion of the resin into its water insoluble form taking place on keeping.

The invention further includes an electrophotographic or like material comprising a support having thereon a layer comprising a photoconductive substance and an electrically insulating film forming binder produced from a water soluble resin forming substance or mixture of substances which have been irreversibly converted by means of a catalyst and/or heat into a resin insoluble in water.

The ratio of resin solids to photoconductive substance may vary from 5:1 to 1:5 the preferred ratio when using finely divided zinc oxide being 2½ parts of photoconductive zinc oxide to 1 part of resin. These ratios may be adjusted to provide material having different speeds of response to light.

Suitable fillers, waxes, plasticizers, antidiscoloration agents, waterproofing agents and sensitisers may be added to the coating composition, for example, in solution or suspension.

Any suitable photoconductive substance may be employed, such as a finely divided zinc oxide or other inorganic photoconductor, or for example, anthracene or other organic types of photoconductive substance, suitable mixtures of two or more photoconductors may be employed. The photoconductive substance may be present in the coating composition in the form of finely-divided solid particles, or, in the case of water-soluble photoconductors in solution or as a sol.

Any appropriate catalyst or accelerator may be used; for example hexamine solutions or ammonium thiocyanate solutions have been found suitable in practice.

The spectral sensitivity of the material produced by the method of this invention may be altered by the addition of certain sensitising dyes or like substances, for example, Rose Bengal or Rhodamine B.

The resins preferred for use in the method of this invention are water soluble aminoplasts which are the condensation product of an amine and formaldehyde (Stewart's Scientific Dict., 4th ed., p. 56), an aqueous solution of, for instance, an amine formaldehyde resin with a photoconductive substance therein being coated on to a suitable base material, the resin forming constituents being converted into hydrophobic form insoluble in water subsequent to coating. Examples of suitable amine resins include the following:

Urea formaldehyde, melamine formaldehyde, aniline formaldehyde, thiourea formaldehyde, cyanamide formaldehyde and dicyanadiamide formaldehyde or mixtures of these.

For instance, a suitable binder for the photoconductive substance may be produced from water soluble urea-formaldehyde-resin-forming constituents.

Any suitable base material or support may be employed such as for instance, paper, metal, plastic material or the like; in certain cases it may be desirable prior to coating the support with the aqueous solution of resin-former and photoconductive substance, to precoat the said support with a suitable precoating composition. According to a feature of the invention the method may include such a precoating step to provide a resinous or other precoat. Such precoating is especially desirable when using fibrous or absorbent bases, such as paper. Where a paper base material is employed it is desirable that the precoating composition should isolate the fibrous structure of the base from the aqueous coating solution. In all cases the precoating composition should be electrically relatively conductive (compared with the cured resin), having an electrical resistivity of, say, $10^5$ to $10^7$ ohms/cm. cube and should be insoluble in the coating solution. Any suitable precoating composition may be employed, for instance cellulose acetate, polyvinylidene chloride, polyvinyl alcohol casein, polyvinyl acetate or mixtures thereof have been found suitable in practice. If desired the electrical conductivity of certain precoating resins may be increased by the addition of electrolytes.

If necessary fibrous base materials or supports may be re-humidified to a moisture content of about 5% to raise the low conductivity they may possess due to their being dried in the heating step.

As mentioned previously in relation to known types of electrophotographic material, the electrical resistivity of the binder (i.e. the resin) must be above $10^{10}$ ohms/cm. cube. Some of the resin-forming constituents which may be used in practising the invention have an electrical resistivity of the order of only $10^2$ ohms/cm. cube which, of course, would be unsuitable for electrophotographic purposes. It has been found, however, that the conversion of the resin to its water-insoluble form after coating on to the base material increases its electrical resistivity up to a value as described, suitable for use in electrophotographic methods. It is thus possible to adjust the degree of conversion of the resin to provide a binder having any predetermined electrical resistivity.

The invention will now be further described with reference to the following specific examples which are given merely by way of illustration. In the examples, percentages, unless otherwise stated, are weight-for-weight.

*Example 1*

10 gm. photoconductive zinc oxide of average particle size 0.2 micron is dispersed in 8 gm. of a solution of melamine formaldehyde resin (90% solids). 1 cc. of a 20% hexamine solution is added and the mixture thoroughly stirred. About 20 cc. of water may be added to adjust the viscosity of the solution to between 50 and 100 centipoises.

The solution is coated by any convenient coating technique on to a paper base material.

The resin is cured by heating in an oven at 120° C. for approximately 3 minutes followed by exposure to a suitable source of infra red radiation for about 5 minutes at a distance of 6″ from the source.

If necessary the paper base material may be rehumidified, for instance by back steaming, to about 5% relative humidity.

The resulting material may be used in an electrophotographic reproduction process, for example as follows: the coating is given an overall electrostatic charge under safe light conditions and is exposed to a light image of an original to be reproduced to form a latent electrostatic image of the said original.

The latent electrostatic image is rendered visible by the application of suitable developer or toner powder (for example, particles of heat-softenable resin pigmented with carbon black, and mixed with glass beads as a carrier) the visible image is fixed in any appropriate manner, for instance by the application of heat.

*Example 2*

4 kg. of urea formaldehyde resin (50% solution in water) of the kind produced by B.I.P. Chemicals Ltd. under the trade name B.C.6, is dissolved in 10 litres of water. 3 kg. of photoconductive zinc oxide of average particle size 0.2 micron is added together with 150 ml. of a 20% ammonium thiocyanate solution as catalyst and the mixture vigorously stirred. The solution is immediately coated on to a paper base material. Any appropriate coating technique may be used. The coated material is dried at 92° C., and then cured at 130° C.

Subsequent to curing the moisture content of the paper base may be adjusted by steaming.

A coating weight of approximately 50 gm./sq. m. has been found appropriate. For this purpose any suitable steps may be taken to adjust the coating weight, for instance water may be added to the coating solution.

*Example 3*

2 gms. of the di-sodium salt of 2,5 - bis - (p - sulphomethylamino phenyl)-1,3,4-oxadiazole is dissolved in 10 ml. of distilled water. In this solution is dissolved 10 ml. of a 60% urea formaldehyde resin of the kind produced by Chemische Werke Albert under the trade name Resamin 403F, and 0.1 gm. of ammonium chloride. The resulting solution poured on to a clean sheet of aluminum. The water is evaporated, whereby a hard coating layer is formed which is then cured by baking at 120° C. for three minutes.

It has been found in practising the invention that even when conversion of the resin has been effected to provide a material of suitable electrical resistivity full conversion may not have been achieved but that nevertheless a material, initially water soluble and having an electrical resistivity unsuited to electrophotographic and like methods, may by the curing process be rendered water-insoluble and possibly also solvent-insoluble, and have its electrical resistivity altered to a value at which the finished material is eminently suited to such methods.

It will be understood that modifications within the scope of the invention may be made in the procedures described in the above examples. In particular, for instance, instead of the heat-curing operations prescribed, the use of resin-forming solutions containing suitable catalysts to effect the resin-forming reaction in the cold, enables the coated supports to be merely dried, and the coating becomes converted to the water-insoluble condition on standing. Also, sensitisers, such as Rose Bengal, Rhodamine B, and like dyes, and other additives mentioned above, may also be included.

I claim:

1. The method of xerography which comprises the steps of electrostatically charging a plate having thereon a photoconductive insulating substance in a condensed irreversibly water-insoluble amine-formaldehyde resin applied by forming an aqueous composition consisting essentially of a photoconductive insulating substance and a water soluble aminoplast which is the condensation product of an amine and formaldehyde, applying said composition to a support to form a coating layer thereon, removing water from said layer and condensing the said aminoplast to an irreversibly water-insoluble resin, exposing said charged plate to a light image to form a latent electrostatic image and developing and fixing said latent image.

2. The method of xerography which comprises the steps of electrostatically charging a plate having thereon a photoconductive insulating substance in a condensed irreversibly water-insoluble amine-formaldehyde resin applied by forming an aqueous composition consisting essentially of a photoconductive insulating substance and at least one water soluble aminoplast which is the condensation product of an amine and formaldehyde, applying said aqueous composition to said plate to form a coating layer thereon, removing the water from said layer by drying, and thereafter irreversibly condensing said aminoplast into a water-insoluble resin in the presence of a catalyst for said condensation, exposing siad charged plate to a light image to form a latent electrostatic image and developing and fixing said latent image.

3. A process as claimed in claim 1 wherein the conversion of the said aminoplast to the irreversibly water-insoluble state is effected at a temperature of at least 100° C., whereby removal is ensured of water formed in the chemical reaction of the amine-formaldehyde resinous substance.

4. A process as claimed in claim 1 wherein the conversion of the said aminoplast to the water-insoluble resin is effected by heat in the presence of a catalyst in the vapour phase.

5. A process as claimed in claim 1 wherein the support after application of the coating layer which contains a resin promoting catalyst, is surface dried, conversion of the said aminoplast to the water-insoluble resin taking place on keeping.

6. A process as claimed in claim 1 wherein the photoconductive substance is zinc oxide.

7. A process as claimed in claim 1 wherein the photoconductive substance is anthracene.

8. A process as claimed in claim 1 wherein the photoconductive substance is 2,5-bis-(p-sulphomethylamino phenyl)-1,3,4-oxadiazole.

9. A process as claimed in claim 1 wherein the said aminoplast is at least one resin from the group consisting of urea formaldehyde, melamine formaldehyde, aniline formaldehyde, thiourea formaldehyde, cyanamide formaldehyde and dicyanadiamide formaldehyde.

References Cited in the file of this patent

UNITED STATES PATENTS

| 1,846,853 | Ellis | Feb. 23, 1932 |
| 2,875,054 | Griggs et al. | Feb. 24, 1959 |
| 2,901,348 | Dessauer et al. | Aug. 25, 1959 |

FOREIGN PATENTS

| 201,301 | Australia | Mar. 19, 1956 |

OTHER REFERENCES

Young et al.: R.C.A. Review, vol XV, No. 4, pp. 469–484 (December 1954).

Ellis: "The Chem. of Synthetic Resins," Reinhold (1935), pp. 630–638.